(12) United States Patent
Claußen et al.

(10) Patent No.: US 12,459,854 B2
(45) Date of Patent: *Nov. 4, 2025

(54) GLASS OR GLASS CERAMIC AS WELL AS METHOD FOR MELTING AND REFINING GLASS OR GLASS CERAMIC

(71) Applicant: Schott AG, Mainz (DE)

(72) Inventors: Olaf Claußen, Undenheim (DE);
Steffen Grün, Wallhausen (DE);
Thomas Lifka, Mainz-Bretzenheim (DE); André Schrepfer, Frankfurt (DE)

(73) Assignee: Schott AG, Mainz (DE)

( * ) Notice: Subject to any disclaimer, the term of this patent is extended or adjusted under 35 U.S.C. 154(b) by 471 days.

This patent is subject to a terminal disclaimer.

(21) Appl. No.: 17/940,432

(22) Filed: Sep. 8, 2022

(65) Prior Publication Data
US 2023/0074664 A1    Mar. 9, 2023

(30) Foreign Application Priority Data
Sep. 8, 2021    (DE) ...................... 10 2021 123 303.8

(51) Int. Cl.
*C03C 1/00*        (2006.01)
*C03B 5/225*      (2006.01)
(Continued)

(52) U.S. Cl.
CPC ............. *C03C 1/004* (2013.01); *C03B 5/225* (2013.01); *C03B 5/2353* (2013.01); *C03B 32/02* (2013.01); *C03C 10/00* (2013.01)

(58) Field of Classification Search
None
See application file for complete search history.

(56) References Cited

U.S. PATENT DOCUMENTS 6,698,244 B1 * 3/2004 Romer .................. C03B 5/44
                                                    65/135.2
9,676,643 B2    6/2017 Lentes et al.
(Continued)

FOREIGN PATENT DOCUMENTS

DE    10 2004 022 936 A1    12/2005

OTHER PUBLICATIONS

German Office Action dated Jan. 12, 2022 for German Patent Application No. 10 2021 123 303.8 (7 pages).

*Primary Examiner* — Christina A Johnson
(74) *Attorney, Agent, or Firm* — TAYLOR & EDELSTEIN, PC

(57) ABSTRACT

A method for melting and/or refining glass, glass ceramic or glass which can be ceramized to form glass ceramic includes: providing a batch of raw materials; heating the batch until a melt of molten glass is obtained, the batch being heated at least in sections to a temperature above T3 which corresponds to a viscosity of the molten glass of $10^3$ dPa*s; refining the melt, the melt being heated at least in sections to a temperature above T2.5 which corresponds to a viscosity of the molten glass of $10^{2.5}$ dPa*s, refining of the melt includes adjusting an oxygen partial pressure $p(O_2)$ which is reduced by at least 60% relative to an $O_2$ saturation in the melt at temperature T3; and obtaining a re-fined glass, a refined glass ceramic or a refined glass which can be ceramized to form glass ceramic.

20 Claims, 3 Drawing Sheets

(51) Int. Cl.
*C03B 5/235* (2006.01)
*C03B 32/02* (2006.01)
*C03C 10/00* (2006.01)

(56) References Cited

U.S. PATENT DOCUMENTS

| | | | |
|---|---|---|---|
| 2010/0313604 A1* | 12/2010 | Watson | F23L 7/007 |
| | | | 65/347 |
| 2013/0086951 A1 | 4/2013 | Charbonneau et al. | |
| 2023/0021281 A1* | 1/2023 | Römer | C03B 5/225 |
| 2023/0081248 A1* | 3/2023 | Claußen | C03B 32/02 |
| | | | 65/134.1 |
| 2023/0082588 A1* | 3/2023 | Knoche | C03C 1/00 |
| | | | 428/34.4 |

* cited by examiner

GLASS OR GLASS CERAMIC AS WELL AS METHOD FOR MELTING AND REFINING GLASS OR GLASS CERAMIC

CROSS REFERENCE TO RELATED APPLICATIONS

This application claims priority to German Patent Application No. DE 10 2021 123 303.8 filed on Sep. 8, 2021, which is incorporated in its entirety herein by reference.

BACKGROUND OF THE INVENTION

1. Field of the Invention

The invention relates to a method for melting and/or refining glass, glass ceramic or glass which can be ceramized to form glass ceramic as well as a glass or a glass ceramic.

2. Description of the Related Art

In the production of glasses and glass ceramics, these normally undergo a refining process after the melt. As a result, among other things, $CO_2$ and $H_2O$ bubbles which are formed during the melting process e.g. as a result of the decomposition of the raw materials to a carbonate or hydroxide basis, are removed from the glass melt. During the refining phase of glass production, the bubbles located in the glass melt grow so that these rise and can leave the melt via the surface.

In the case of conventional refining methods, the glass melt is brought to a high temperature in a part of the melting tank, i.e. in a refining section of a melting tank, or a downstream region, e.g. a refining chamber. If the melt contains refining agents, these release a refining gas, such as e.g. $O_2$. This refining gas diffuses into existing bubbles and enlarges these to such an extent that the bubbles rise in the melt and can leave it.

Legal provisions currently apply to some of the traditional refining agents, such as e.g. the multivalent oxide refining agents $Sb_2O_3$ and $As_2O_3$, to not use them or use them only in an environmentally sustainable manner, but there are also customer demands which require a reduced use of such refining agents.

Acceptable, environmentally sustainable refining agents, such as e.g. $SnO_2$, can, in excessive constructions, have a disadvantageous effect on some glass properties such as transmission and susceptibility to crystallisation.

What is needed in the art is a way to reduce the quantity of multivalent oxide refining agents required for very good product quality.

SUMMARY OF THE INVENTION

Exemplary embodiments of methods provided according to the invention reduce the required quantity of multivalent oxide refining agents while providing outstanding product quality.

In this context, the method provided according to the invention makes it possible to increase the quantity of $O_2$ released from the refining agent and thus the conversion rate of the refining agents used in the case of the selected refining temperatures, also to achieve improved refining with lower quantities of refining agent used, i.e. a glass or a glass ceramic with only a few bubbles.

In some embodiments, the invention relates to a method for melting and/or refining glass, glass ceramic or glass which can be ceramized to form glass ceramic, comprising the steps:

providing a batch of raw materials;

heating the batch until a melt is obtained, in particular wherein the batch is heated at least in sections to a temperature above T3 which corresponds to a viscosity of the molten glass of $10^3$ dPa*s;

refining the melt, in particular wherein the melt is heated at least in sections to a temperature above T2.5 which corresponds to a viscosity of the molten glass of $10^{2.5}$ dPa*s; and obtaining a refined glass, a refined glass ceramic or a refined glass which can be ceramized to form glass ceramic;

wherein at least one refining agent of the formula $X_nO_m$, wherein n=1 or 2, wherein m=2 or 5, wherein X=As, Sb, Sn, or Ce, and/or of the formula $M_nSO_4$, wherein n=1 or 2, and M=Na, K, Li, Mg, Ca, Sr, Ba and/or Zn, with a concentration of 2 wt.-% or less, relative to the total mass of the batch of raw materials, is used, wherein the refining agent has the thermodynamic property that it has an at least 30% conversion of the refining agent from a higher into a lower oxidation state in a melt of the same composition as the melt in the refining step in the case of an oxygen partial pressure $p(O_2)$ of 1 bar and a temperature T2, in particular according to the reaction of $X_nO_m \rightarrow X_nO_{m-1}+\frac{1}{2}O_2$ and/or $X_nO_m \rightarrow X_nO_{m-2}+O_2$, and/or according to the reaction of $M_nSO_4 \rightarrow MnO+SO_2+\frac{1}{2}O_2$, wherein temperature T2 corresponds to a viscosity of the molten glass of $10^2$ dPa*s, with the step of adjustment of an oxygen partial pressure $p(O_2)$ during refining of the melt which is reduced by at least 60%, optionally at least 70%, relative to the $O_2$ saturation in the melt in the case of temperature T3.

In some embodiments, the invention relates to a method for melting and/or refining glass, glass ceramic or glass which can be ceramized to form glass ceramic, wherein the melting and/or refining are/is performed with heating by $H_2$ and $O_2$ combustion, wherein the melting is performed using an oxygen to fuel equivalence ratio $\lambda > 1.00$, for example >1.05, and/or the refining is performed using an oxygen to fuel equivalence ratio $\lambda < 1.00$, for example <1.05.

In some embodiments, the invention relates to a glass, a glass ceramic or a glass which can be ceramized to form glass ceramic which can be produced or is produced according to a method provided according to the invention.

In some embodiments, the invention relates to a glass, a glass ceramic or a glass which can be ceramized to form glass ceramic, wherein the $Fe^{2+}$ to $Fe^{3+}$ ratio in the glass or the glass ceramic is at least 0.02, wherein the glass or the glass ceramic has fewer than 80 bubbles of a size of 0.1 mm to 0.2 mm per 10 kg glass or glass ceramic and/or fewer than 2 bubbles of a size of more than 0.2 mm per 10 kg glass or glass ceramic.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Definitions and Methods

Figure 1:
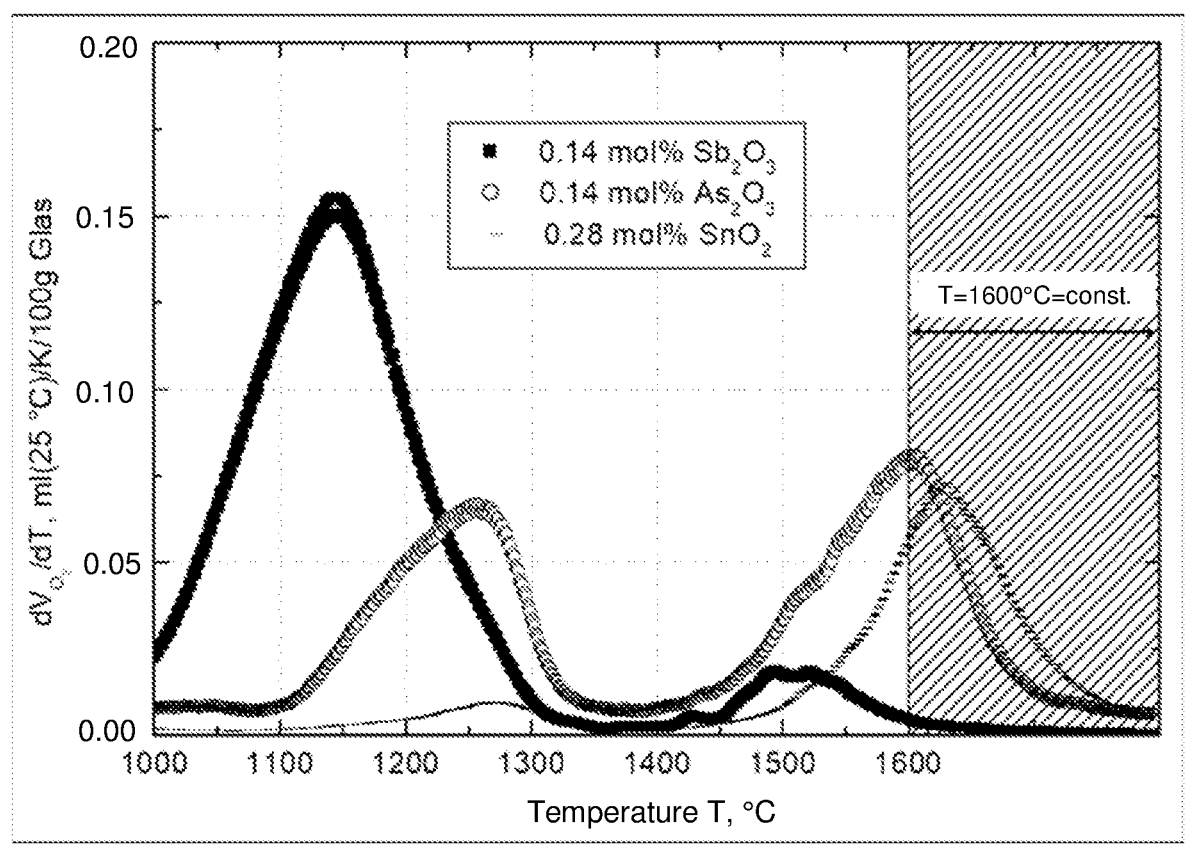
FIG. 1 illustrates the oxygen release of the refining agents $Sb_2O_3$, $As_2O_3$ and $SnO_2$ in a glass which can be ceramized to form a glass ceramic as a function of the temperature.

A "glass melt" or "melt" is a volume of a batch of glass raw materials or glass starting materials which has a viscosity of lower than $10^{7.6}$ dPa·s.

A "bubble" is a gaseous inclusion within a glass or a glass melt which has generally a diameter of at least 10 μm. "Diameter" refers here to the spherical equivalence diameter. If the "size" of a bubble is discussed in the description, this refers to the spherical equivalence diameter. Within this description, the term "bubble" can be understood both as a gaseous inclusion in the widest sense as well as a "$CO_2$ bubble" or "$O_2$ bubble" in one particular meaning.

The "oxygen-fuel equivalence ratio A" defines the quantity of oxygen which is necessary for a reaction or conversion of the fuels into combustion products, such as e.g. $H_2O$ or $CO_2$. $\lambda=1.00$ is correspondingly stoichiometric, wherein fuel-rich mixtures have a $\lambda<1.00$, and mixtures with a low level of fuel have a $\lambda>1.00$. Mixtures with a low level of fuel with $\lambda>1.00$ therefore enable a complete conversion of the fuel, with an excess of (remaining) oxygen.

Where the term "ppm" is used in the description in the context of solids or liquids, this should be understood as 'mass/mass'; in the context of gases, "ppm" refers to 'volume/volume'.

"Dwell time" is the time which a specific part of the glass melt remains in a specific container or partial container (e.g. melting vessel or refining vessel) in a continuous process before it is removed. In the literature, the term "dwell time" is used equivalent to "dwell period". The "minimal dwell time" is the time which a specific part of the glass melt remains in the container or partial container in a continuous process even if this part crosses the container or partial container by the quickest path. The "hydrodynamic dwell time" is defined as the ratio between "(partial) container volume [m³]" and the "(partial) container throughput [m³ h⁻¹]". The "hydrodynamic dwell time" can therefore be understood as the "mean dwell time" or the "mean dwell period", i.e. as the time that a certain part of the glass melt remains in the container or part of the container in a continuous process if this part of the container or part of the container is traversed along the path that corresponds to the mathematical mean value or the physical average throughput speed.

"Refining period" is the time which a specific part of the glass melt remains in a specific container or partial container (e.g. refining vessel) for the purpose of refining in a discontinuous process before it is removed. In this case, the melt has at least in sections a refining temperature, in particular a temperature above T2.5.

DESCRIPTION OF THE INVENTION

In some embodiments, the invention relates to a method for melting and/or refining glass, glass ceramic or glass which can be ceramized to form glass ceramic, comprising the steps providing a batch of raw materials, heating the batch until a melt is obtained, in particular wherein the batch is heated at least in sections to a temperature above T3 which corresponds to a viscosity of the molten glass of $10^3$ dPa*s, refining the melt, wherein the melt is heated at least in sections to a temperature above T2.5 which corresponds to a viscosity of the molten glass of $10^{2.5}$ dPa*s, and obtaining a refined glass, a refined glass ceramic or a refined glass which can be ceramized to form glass ceramic, wherein at least one refining agent of the formula $X_nO_m$, wherein n=1 or 2, wherein m=2 or 5, wherein X=As, Sb, Sn, or Ce, and/or of the formula $M_nSO_4$, wherein n=1 or 2, and M=Na, K, Li, Mg, Ca, Sr, Ba and/or Zn, with a concentration of 2 wt.-% or less, relative to the total mass of the batch of raw materials, is used, wherein the refining agent has the thermodynamic property that it has an at least 30% conversion from a higher into a lower oxidation stage in a melt of the same composition as the melt in the refining step at an oxygen partial pressure $p(O_2)$ of 1 bar and a temperature T2, in particular according to the reaction of $X_nO_m \rightarrow X_nO_{m-1}+\frac{1}{2}O_2$ and/or $X_nO_m \rightarrow X_nO_{m-2}+O_2$, and/or according to the reaction of $M_nSO_4 \rightarrow MnO+SO_2+\frac{1}{2}O_2$, wherein temperature T2 corresponds to a viscosity of the molten glass of $10^2$ dPa*s, with the step of adjustment of an oxygen partial pressure $p(O_2)$ during refining of the melt which is reduced by at least 60%, optionally at least 70%, relative to the $O_2$ saturation in the melt at temperature T3.

In some embodiments, the step "refining the melt" takes place in a refining period, wherein the refining period in a discontinuous process is at least 2 hours but at most 96 hours.

In some embodiments, the step "refining the melt" takes place at a mean dwell period, wherein the mean dwell period of the melt during refining in a continuous process is at least 2 hours but at most 18 hours.

In some embodiments of the method, this involves a method for melting and/or refining glass, glass ceramic or glass which can be ceramized to form glass ceramic.

In some embodiments of the method, this involves a method for refining glass, glass ceramic or glass which can be ceramized to form glass ceramic. It is implicitly assumed that refining requires a heating of the glass, the glass ceramic or the glass ceramic which can be ceramized to form glass ceramic to high temperatures, namely temperatures which are suitable for refining, in particular above T2.5.

The method makes it possible to reduce the required quantity of multivalent oxide refining agents alongside outstanding product quality. The method provided according to the invention achieves this in that it increases the quantity of $O_2$ released from the refining agent and thus improves the conversion rate of the refining agents used in the case of the respectively required refining temperatures. The method provided according to the invention therefore achieves improved refining even with small quantities of refining agent used, i.e. a glass or a glass ceramic with only a few bubbles.

In some embodiments of the method, the step of heating the batch until a melt is obtained is performed, wherein the batch is heated at least in sections or substantially entirely to a temperature above T3 which corresponds to the molten glass of $10^3$ dPa*s, wherein the batch is heated at most to a temperature T2.5 which corresponds to a viscosity of the molten glass of $10^{2.5}$ dPa*s.

In some embodiments of the method, the step of refining the melt is performed, wherein the melt is heated at least in sections or substantially entirely to a temperature above T2.5 which corresponds to a viscosity of the molten glass of $10^{2.5}$ dPa*s, wherein the melt is heated at least to a temperature T2.2, T2-100° C. or T2-150° C., which corresponds to a viscosity of the molten glass of $10^{2.2}$ dPa*s, and/or wherein the melt is heated at most to a temperature T2 which corresponds to a viscosity of the molten glass of $10^2$ dPa*s.

In some embodiments of the method, the step "refining the melt" is carried out, wherein the melt is heated in sections or essentially completely to a temperature above T2.5, which corresponds to a viscosity of the molten glass of $10^{2.5}$ dPa*s, wherein optionally the melt is heated to a temperature of at least T2.2, T2-100° C. or T2-150° C., which corresponds to a viscosity of the molten glass of $10^{2.2}$ dPa*s, and/or wherein the melt is heated at most to a temperature T2 corresponding to a viscosity of the molten glass of $10^2$ dPa*s, wherein the step "refining the melt" takes place at a refining period, the refining period being at least 2 hours but at most 96 hours in a discontinuous process.

In some embodiments of the method, the step "refining the melt" is carried out, wherein the melt is heated in sections or essentially completely to a temperature above T2.5, which corresponds to a viscosity of the molten glass of $10^{2.5}$ dPa*s, wherein optionally the melt is heated to a temperature of at least T2.2, T2-100° C. or T2-150° C., which corresponds to a viscosity of the molten glass of $10^{2.2}$ dPa*s, and/or wherein the melt is heated to at most a temperature T2 corresponding to a viscosity of the molten glass of $10^2$ dPa*s, wherein the step "refining the melt" takes place at a mean dwell period, wherein the mean dwell period of the melt during refining in a continuous process is at least 2 hours, but not more than 18 hours.

In some embodiments, the method is characterized by the selection of the refining agent, wherein the refining agent has the thermodynamic property that it has an at least 30% conversion from a higher into a lower oxidation state in a melt of the same composition as the melt in the refining step in the case of an oxygen partial pressure $p(O_2)$ of 1 bar and a temperature T2, or at least 35% conversion, at least 40% conversion, or at least 45% conversion, of the refining agent from a higher into a lower oxidation state, in particular according to the reaction of $X_nO_m \rightarrow X_nO_{m-1} + \frac{1}{2}O_2$ and/or $X_nO_m \rightarrow X_nO_{m-2} + O_2$, and/or according to the reaction of $M_nSO_4 \rightarrow MnO + SO_2 + \frac{1}{2}O_2$, wherein temperature T2 corresponds to a viscosity of the molten glass of $10^2$ dPa*s. The conversion of the refining agent is influenced by various factors, such as e.g. the temperature of the melt and the oxygen partial pressure in the melt. The respective conversion (in %) for a given refining agent in the case of an oxygen partial pressure ($O_2$) of 1 bar and a temperature T2 relates to chemical equilibrium conditions. For example, an at least 30% conversion according to the reaction of $X_nO_m \rightarrow X_nO_{m-1} + \frac{1}{2}O_2$ means that, in the chemical equilibrium, at least 30 mol % of reduced species $X_nO_{m-1}$ relative to the total quantity of $X_nO_m$ and $X_nO_{m-1}$ is present. For the sake of clarity: The indication that a refining agent has the thermodynamic property of a degree of conversion in the case of an oxygen partial pressure of 1 bar and a temperature T2 in the melt does not characterise a method step, but rather a property of the refining agent in hypothetical melting conditions. This does not mean that the melt has to be present at a specific point in time in the case of the T2 temperature and/or an oxygen partial pressure of 1 bar must prevail. On the contrary, the feature describes how the refining agent behaves in certain conditions. It thus indicates a selection rule for the refining agent as a function of the composition of the melt. This property of the refining agent can be determined experimentally. A differentiation should be made between this and the method steps actually performed and the conditions which actually prevail. The actual conversion of the refining agent can thus be influenced as described herein, in particular it can be increased by reduction of the oxygen partial pressure.

In some embodiments, the method, and in particular the refining step, is performed for a sufficient time so that an at least 30% conversion, at least 35% conversion, at least 40% conversion, or at least 45% conversion, of the refining agent takes place. If a mixture of several refining agents is used, this refers to an actual conversion (in mol %) of at least 30%, at least 35%, at least 40%, or at least 45%, which relates to the sum of the amount of substance proportions of the refining agents used. This means that, in the chemical equilibrium condition, at least 30 mol % of the sum of all reduced species relative to the total amount of substance of reduced and oxidized species is present. The person skilled in the art is able to both theoretically estimate and determine by measurement technology and confirm the necessary time (cf. e.g. FIG. 3) which is required for a desired conversion of the refining agent. This time can correspond to an average dwell time of the melt in a refining vessel or refining section of 2 to 18 hours in a continuous process. This time can analogously correspond to a refining period of 2 to 96 hours in a discontinuous process.

Figure 2:
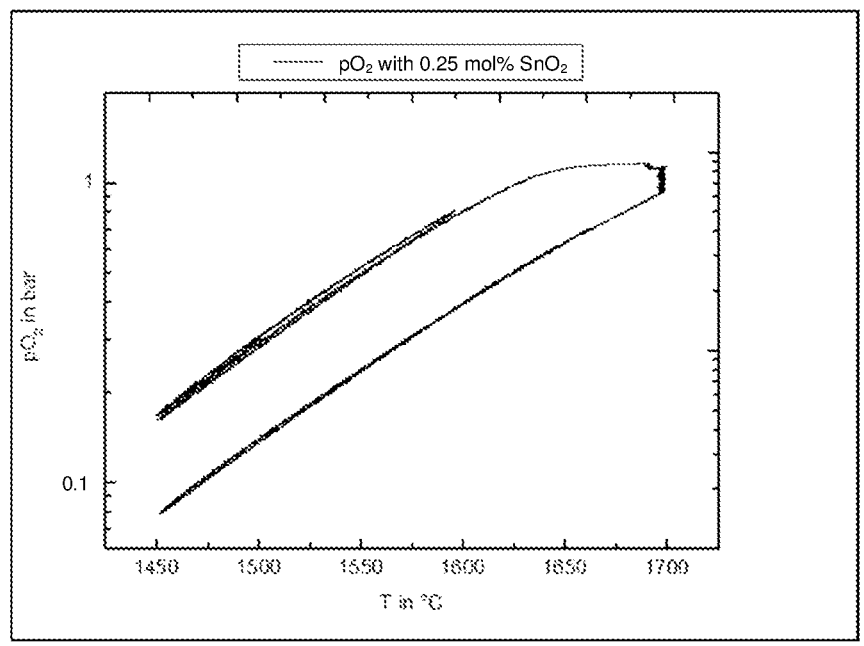
FIG. 2 illustrates the profile of the oxygen partial pressure $p(O_2)$ of a melt refined with $SnO_2$ of a glass which can be ceramized to form a glass ceramic.

In some embodiments, the method is characterized in that an oxygen partial pressure $p(O_2)$ during the refining of the melt is adjusted which is reduced by at least 60%, optionally at least 70%, relative to the $O_2$ saturation in the melt in the case of temperature T3 (cf. e.g. FIG. 2). The $O_2$ saturation in the melt and the reduced oxygen partial pressure $p(O_2)$ during the refining of the melt relate to chemical equilibrium conditions in the case of the respectively adjusted temperature. For the sake of clarity, the reference to the $O_2$ saturation in the melt in the case of temperature T3 optionally only serves as a reference value. This does not imply that a state of equilibrium must actually be achieved at this temperature. This method feature can be realized e.g. by adjusting a correspondingly selected temperature and/or the use of a low oxygen-fuel equivalence ratio 2. Alternative or additionally, this method feature can be realized e.g. by the use of an absolute pressure of 0.5 bar or less, 0.4 bar or less, 0.3 bar or less, 0.2 bar or less, 0.1 bar or less, or 0.05 bar or less, in the region above the glass melt. The absolute pressure above the melt during refining is, however, optionally at least 0.5 bar.

The reduction in the oxygen partial pressure $p(O_2)$ in the glass melt by at least 60%, optionally at least 70%, relative to the $O_2$ saturation in the melt in the case of temperature T3, ensures a displacement of the respective equilibrium according to the reaction of $X_nO_m \rightarrow X_nO_{m-1} + \frac{1}{2}O_2$ or $X_nO_m \rightarrow X_nO_{m-2} + O_2$, or according to the reaction of $M_nSO_4 \rightarrow MnO+SO_2+\frac{1}{2}O_2$, in favor of the product side, i.e. in favor of the reduced refining agent and the thereby generated $O_2$.

In some embodiments, a refining agent of the formula $X_nO_m$ is used, wherein n=1 or 2, wherein m=2 or 5, wherein X=As, Sb, Sn, or Ce. In some embodiments, a refining agent of the formula $M_nSO_4$ is used, wherein n=1 or 2, M=Na, K, Li, Mg, Ca, Sr, Ba and/or Zn. In an embodiment which is both dependent on and independent of this, one or more refining agents with a concentration of 2 wt.-% or less, relative to the total mass of the batch of raw materials, and/or a concentration of at least 0.05 wt.-%, at least 0.1 wt.-%, or at least 0.2 wt.-%, relative to the total mass of the batch of raw materials, is used. In some embodiments, one or more refining agents is used with a concentration of 0.05 to 2 wt.-%, 0.1 to 1 wt.-%, or 0.2 to 0.5 wt.-%, relative to the total mass of the batch of raw materials. One or more refining agents can be used. If "the refining agent" or "a refining agent" is discussed herein, this does not rule out the use of a combination of several refining agents. Each of the refining agents stated herein can equally also be used as a single refining agent. If several refining agents are used, the statements made here correspondingly apply to the combination of the refining agents.

In some embodiments, an additional refining agent selected from the list of chlorides and fluorides, e.g. NaCl, KCl, NaF, KF, is used.

In some embodiments, the refining agent has the thermodynamic property that it has an at least 30% conversion from a higher into a lower oxidation state in a melt of the same composition as the melt in the refining step in the case of an oxygen partial pressure $p(O_2)$ of 1 bar and a temperature T2, or at least 35% conversion of the refining agent, at least 40% conversion of the refining agent, at least 45% conversion of the refining agent, or at least 50% conversion of the refining agent, in particular according to the reaction of $X_nO_m \rightarrow X_nO_{m-1}+\frac{1}{2}O_2$ and/or $X_nO_m \rightarrow X_nO_{m-2}+O_2$, and/or according to the reaction of $M_nSO_4 \rightarrow MnO+SO_2+\frac{1}{2}O_2$, wherein temperature T2 corresponds to a viscosity of the molten glass of $10^2$ dPa*s. In some embodiments, the refining agent has the thermodynamic property that it has an at most 99% conversion of the refining agent, at most 95% conversion of the refining agent, at most 90% conversion of the refining agent, or at most 80% conversion of the refining agent, in a melt of the same composition as the melt in the refining step in the case of an oxygen partial pressure $p(O_2)$ of 1 bar and a temperature T2, in particular according to the reaction of $X_nO_m \rightarrow X_nO_{m-1}+\frac{1}{2}O_2$ and/or $X_nO_m \rightarrow X_nO_{m-2}+O_2$, and/or according to the reaction of $M_nSO_4 \rightarrow MnO+SO_2+\frac{1}{2}O_2$, wherein temperature T2 corresponds to a viscosity of the molten glass of $10^2$ dPa*s.

In some embodiments of the method, the method comprises the step of adjusting an oxygen partial pressure $p(O_2)$ in the glass melt which is reduced by at least 60%, optionally at least 70%, or at least 80%, relative to the $O_2$ saturation in the melt in the case of temperature T3.

In some embodiments of the method, the method comprises the step of adjusting an oxygen partial pressure $p(O_2)$ in the melt which is reduced by at most 99%, optionally at most 95%, or at most 90%, relative to the $O_2$ saturation in the melt after heating of the batch and prior to refining of the melt. In some embodiments of the method, the method comprises the step of adjusting an oxygen partial pressure $p(O_2)$ in the melt which is reduced by 60% to 99%, optionally 70% to 95%, or 80% to 90%, relative to the $O_2$ saturation in the melt after heating of the batch and prior to refining of the melt.

In some embodiments, the $Fe^{2+}$ to $Fe^{3+}$ ratio in the (refined) glass, the (refined) glass ceramic or the refined glass which can be ceramized to form glass ceramic is at least 0.02, or at least 0.05, at least 0.1, at least 0.2, at least 0.3, or at least 0.4. In some embodiments, the $Fe^{2+}$ to $Fe^{3+}$ ratio in the (refined) glass, the (refined) glass ceramic or the (refined) glass which can be ceramized to form glass ceramic is at most 1.00, at most 0.99, at most 0.95, at most 0.9, at most 0.8, or at most 0.7. In some embodiments, the $Fe^{2+}$ to $Fe^{3+}$ ratio in the (refined) glass, the (refined) glass ceramic or the (refined) glass which can be ceramized to form glass ceramic is from 0.02 to 1.0, 0.05 to 0.99, 0.1 to 0.95, 0.2 to 0.9, 0.3 to 0.8, or 0.4 to 0.7. The method facilitates the release of oxygen from the respectively used refining agent and thus enables the adjustment of desired redox conditions in terms of a $Fe^{2+}$ to $Fe^{3+}$ ratio to be achieved in the refined glass, the refined glass ceramic or the refined glass which can be ceramized to form glass ceramic. In particular, the method facilitates reducing conditions which, as a function of the original $Fe^{2+}$ to $Fe^{3+}$ ratio, displace the equilibrium to the benefit of $Fe^{2+}$ and thereby improve the refining result.

In some embodiments, relating to both the method and the glass, the glass ceramic and the glass ceramic which can be ceramized to form glass ceramic, the ratio of the reduced form of the refining agent to the oxidized form of the refining agent, in particular the $X_nO_{m-1}$ to $X_nO_m$ ratio or the $X_nO_{m-2}$ to $X_nO_m$ ratio, in the (refined) glass, the (refined) glass ceramic or the (refined) glass which can be ceramized to form glass ceramic is at least 0.6, at least 0.7, at least 0.8, at least 1.0, or at least 2.0. In some embodiments, the ratio of the reduced form of the refining agent to the oxidized form of the refining agent, in particular the $X_nO_{m-1}$ to $X_nO_m$ ratio or the $X_nO_{m-2}$ to $X_nO_m$ ratio, in the (refined) glass, the (refined) glass ceramic or the (refined) glass which can be ceramized to form glass ceramic is at most 99.0, at most 90.0, at most 50.0, at most 10.0, or at most 5.0. In some embodiments, the ratio of the reduced form of the refining agent to the oxidized form of the refining agent, in particular the $X_nO_{m-1}$ to $X_nO_m$ ratio or the $X_nO_{m-2}$ to $X_nO_m$ ratio, in the (refined) glass, the (refined) glass ceramic or the (refined) glass which can be ceramized to form glass ceramic is from 0.6 to 99.0, from 0.7 to 90.0, from 0.8 to 50.0, from 1.0 to 10.0, or from 2.0 to 5.0. The method facilitates the release of oxygen from the respectively used refining agent and thus enables the adjustment of a desirable or desired ratio between the reduced and the oxidized form of the respectively used refining agent in the (refined) glass, the (refined) glass ceramic or the (refined) glass which can be ceramized to form glass ceramic.

In some embodiments, the refining agent is selected from the list of $Na_2SO_4$, $K_2SO_4$, $Li_2SO_4$, $MgSO_4$, $CaSO_4$, $SrSO_4$, $ZnSO_4$, $Sb_2O_5$, $As_2O_5$, $CeO_2$ and $SnO_2$ or mixtures thereof.

The refining agents $Sb_2O_5$, $As_2O_5$, $CeO_2$ and $SnO_2$ are normally made available at the start in the batch of raw materials in their respectively lowest oxidation state. For example, the refining agents $Sb_2O_5$ and $As_2O_5$ are made available in the batch of raw materials normally in the form of $Sb_2O_3$ and $As_2O_3$.

The indications in weight-% (wt.-%) relate to the sum of all oxidized and reduced species of the respective refining agent, e.g. $Sb_2O_5$, $As_2O_5$, $CeO_2$ and $SnO_2$ and therefore include e.g. in each case $Sb_2O_3$, $As_2O_3$, CeO and SnO.

In some embodiments, the refining agent is $SnO_2$, in particular the refining agent is $SnO_2$ and is used in a concentration of 0.05 to 2 wt.-%, 0.1 to 1 wt.-%, or 0.2 to 0.5 wt.-%, relative to the total mass of the batch of raw materials.

In some embodiments, the refining agent is $As_2O_5$, in particular the refining agent is $As_2O_5$ and is used in a concentration of 0.05 to 2 wt.-%, 0.1 to 1 wt.-%, or 0.2 to 0.5 wt.-%, relative to the total mass of the batch of raw materials.

In some embodiments, the refining agent is $Sb_2O_5$, in particular the refining agent is $Sb_2O_5$ and is used in a concentration of 0.05 to 2 wt.-%, 0.1 to 1 wt.-%, or 0.2 to 0.5 wt.-%, relative to the total mass of the batch of raw materials.

In some embodiments, the refining agent is a sulphate, in particular $Na_2SO_4$, in particular the refining agent is a sulphate and is used in a concentration of 0.05 to 2 wt.-%, 0.1 to 1 wt.-%, or 0.2 to 0.5 wt.-%, relative to the total mass of the batch of raw materials.

The stated refining agents can be used individually or as a combination of two or more refining agents. In some embodiments, the refining can be additionally supported with chlorides and fluorides.

In some embodiments, the (refined) glass or the (refined) glass ceramic has fewer than 80 bubbles of a size of 0.1 mm to 0.2 mm per 10 kg glass and/or fewer than 2 bubbles of a size of more than 0.2 mm per 10 kg glass.

In some embodiments, the (refined) glass or the (refined) glass ceramic has fewer than 80 bubbles of a size of 0.1 mm to 0.2 mm per 10 kg glass, fewer than 40 bubbles of a size of 0.1 mm to 0.2 mm per 10 kg glass, fewer than 10 bubbles of a size of 0.1 mm to 0.2 mm per 10 kg glass, fewer than 5 bubbles of a size of 0.1 mm to 0.2 mm per 10 kg glass, or fewer than 2 bubbles of a size of 0.1 mm to 0.2 mm per 10 kg glass, and/or fewer than 2 bubbles of a size of more than 0.2 mm per 10 kg glass.

In some embodiments, the (refined) glass or the (refined) glass ceramic has at least 0.1 bubbles of a size of 0.1 mm to 0.2 mm per 10 kg glass, or at least 0.5 bubbles of a size of 0.1 mm to 0.2 mm per 10 kg glass, and/or at least 0.1 bubbles of a size of more than 0.2 mm per 10 kg glass.

The reference of a specific number of bubbles per 10 kg glass equally applies to 10 kg glass ceramic or 10 kg glass which can be ceramized to form glass ceramic, and should be understood in an analogous manner. Moreover, the feature of a specific number of bubbles per 10 kg glass should not be understood such that the glass, the glass ceramic or the glass which can be ceramized to form glass ceramic must have a mass of 10 kg. The reference mass of 10 kg only serves to determine the number of bubbles in a glass, a glass ceramic or a glass which can be ceramized to form glass ceramic of a different mass in a comparative manner.

In some embodiments, the (refined) glass or the (refined) glass ceramic has a mass of at least 1 g, at least 5 g, at least 10 g, at least 50 g, or at least 100 g. In some embodiments, the (refined) glass or the (refined) glass ceramic has a volume of at least 0.5 ml, at least 2.5 ml, at least 5 ml, at least 25 ml, or at least 50 ml.

In some embodiments, the method is performed discontinuously. This is advantageous, in particular in conjunction with $H_2$ and $O_2$ firing, because as a result of this the refining phase can be lengthened so that the reduction in the oxygen partial pressure $p(O_2)$ inherent with an increase in the refining agent conversion during refining of the melt can be particularly well controlled and adjusted.

In some embodiments of the method, the refining duration in a discontinuous process is at least 2 hours, at least 8 hours, at least 16 hours, or at least 24 hours, however, at most 96 hours, at most 72 hours, or at most 48 hours. In some embodiments of the method, the refining duration in a discontinuous process is 2 to 96 hours, 8 to 72 hours, 16 to 72 hours, or 24 to 48 hours.

The adjustment of a specific duration of the refining in a discontinuous process enables sufficient reaction time or sufficient conversion of the refining agent used, as well as a (inherent) sufficient release of $O_2$ from the melt, as well as an adjustment of the basic chemical equilibria. This refers in particular to the chemical equilibria between the reduced and oxidized form of the refining agent used in the (glass) melt, as well as the chemical equilibrium between the oxygen partial pressure $p(O_2)$ in the glass melt and above the glass melt (as a function of the temperature).

In some embodiments of the method, the refining is performed in a continuous process, wherein the average dwell time of the melt during the refining is at least 2 hours, at least 4 hours, at least 6 hours, or at least 8 hours. The average dwell time of the melt during the refining is, however, at most 18 hours, at most 16 hours, at most 14 hours, or at most 12 hours. In some embodiments of the method, the refining is performed in a continuous process, wherein the average dwell time of the melt during the refining is 2 to 18 hours, 4 to 16 hours, 6 to 14 hours, or 8 to 12 hours.

In some embodiments of the method, refining is carried out in a continuous process, wherein the hydrodynamic dwell time of the melt during refining is at least 2 hours, at least 4 hours, at least 6 hours or at least 8 hours. However, the hydrodynamic dwell time of the melt during refining is at most 18 hours, at most 16 hours, at most 14 hours, or at most 12 hours. In some embodiments of the method, refining is carried out in a continuous process, wherein the hydrodynamic dwell time of the melt during fining is 2 to 18 hours, 4 to 16 hours, 6 to 14 hours, or 8 to 12 hours.

The adjustment of a specific average dwell time of the melt during the refining in a continuous process enables sufficient reaction time or sufficient conversion of the refining agent used, as well as a (inherent) sufficient release of $O_2$ from the melt, as well as an adjustment of the basic chemical equilibria. This refers in particular to the chemical equilibria between the reduced and oxidized form of the refining agent used in the (glass) melt, as well as the chemical equilibrium between the oxygen partial pressure $p(O_2)$ in the glass melt and above the glass melt (as a function of the temperature).

In some embodiments, the method is performed with heating by $H_2$ and $O_2$ combustion. In some embodiments of the method, at least 10%, at least 25%, at least 50%, at least 75%, at least 90%, or at least 99%, of the energy required for the method is provided by $H_2$ and $O_2$ combustion.

In some embodiments, the method is performed with heating by $H_2$ and $O_2$ combustion, wherein at least 50%, at least 80%, at least 90%, or at least 99%, of the $H_2$ und $O_2$ is made available from the electrolysis of $H_2O$. The electrolysis of $H_2O$ is optionally operated by renewable energies. This is advantageous because the environmental impact is thus minimized, fossil fuels are dispensed with, and thus a reduction in the $CO_2$ output is enabled.

In some embodiments, the refining method is performed in the case of an oxygen to fuel equivalence ratio 2 which is lower than 1.00, in particular lower than 1.05. This is in particular advantageous in the sense of the economical use of oxygen which can react (almost) entirely. In some embodiments, the melting method is performed in the case of an oxygen to fuel equivalence ratio λ of greater than 1.00, in particular greater than 1.05. It is equally advantageous to keep the additional input of oxygen low in order to promote the reduction of the oxygen partial pressure $p(O_2)$ during refining of the melt.

In some embodiments, the invention relates to a method for melting and/or refining glass, glass ceramic or glass which can be ceramized to form glass ceramic, wherein the melting and/or refining is performed with heating by $H_2$ and $O_2$ combustion, wherein the melting is performed in the case of an oxygen to fuel equivalence ratio $\lambda > 1.00$, in particular $>1.05$, and/or the refining is performed in the case an oxygen to fuel equivalence ratio $\lambda < 1.05$, in particular $<1.00$.

In some embodiments of the method for melting and/or refining glass, glass ceramic or glass which can be ceramized to form glass ceramic, the melting and/or refining is performed with heating by $H_2$ and $O_2$ combustion, wherein the melting is performed in the case of an oxygen to fuel equivalence ratio $\lambda > 1.00$ and $2 < 1.20$, in particular $>1.01$, $>1.02$ or $>1.03$, in particular $\lambda > 1.05$ and $\lambda < 1.15$, and/or wherein the refining is performed in the case of an oxygen to fuel equivalence ratio $\lambda < 1.05$ and $\lambda > 0.90$, in particular $<0.99$, $<0.98$ or $<0.97$, in particular $\lambda < 1.00$ and $\lambda > 0.95$.

Such a method is advantageous because it exploits the advantages of an oxygen to fuel equivalence ratio $\lambda > 1.00$ during melting and combines them with the advantages of an oxygen to fuel equivalence ratio of $\lambda < 1.00$, in particular $<1.05$, during refining. As a result of this, the additional input of oxygen is kept low in particular in the refining phase in order to promote the reduction in the oxygen partial pressure $p(O_2)$ during refining of the melt.

In comparison with conventional methods which perform the melting and/or refining with heating by fossil fuels and $O_2$ combustion, as a result of the incomplete combustion, it is not possible to operate in the case of an oxygen to fuel equivalence ratio $\lambda$ of approximately $>1.00$ during melting. The input of CO and/or C as a result of the incomplete combustion leads to numerous undesirable problems in the melt and in the method apparatus. The stated disadvantages would come to bear to an even greater extent during heating with fossil fuels if the refining is performed in the case of an oxygen to fuel equivalence ratio $\lambda < 1.05$, in particular $<1.00$.

In some embodiments, the invention relates to a glass, a glass ceramic or in particular a glass which can be ceramized to form glass ceramic which can be produced or is produced according to any one of the methods described above.

In some embodiments, the invention relates to a glass, a glass ceramic or a glass which can be ceramized to form glass ceramic, wherein the $Fe^{2+}$ to $Fe^{3+}$ ratio in the glass or the glass ceramic is at least 0.02, wherein the glass or the glass ceramic has fewer than 80 bubbles of a size of 0.1 mm to 0.2 mm per 10 kg glass or glass ceramic and/or fewer than 2 bubbles of a size of more than 0.2 mm per 10 kg glass or glass ceramic.

In some embodiments of the glass, glass ceramic or glass which can be ceramized to form glass ceramic, the glass or the glass ceramic has at least one refining agent of the formula $X_nO_m$, wherein n=1 or 2, wherein m=2 or 5, wherein X=As, Sb, Sn, or Ce, and/or of the formula $M_nSO_4$, wherein n=1 or 2, and M=Na, K, Li, Mg, Ca, Sr, Ba and/or Zn, with a total concentration of 0.4 wt.-% or less, relative to the total mass of the batch of the glass or the glass ceramic. The total concentration in weight-% (wt.-%) relates to the sum of all oxidized and reduced species of the respective refining agents used, e.g. $Sb_2O_5$, $As_2O_5$, $CeO_2$ and $SnO_2$ and therefore include e.g. in each case $Sb_2O_3$, $As_2O_3$, CeO and SnO.

In some embodiments of the glass, the glass ceramic or the glass which can be ceramized to form glass ceramic, the glass or the glass ceramic has a neutral carbon footprint. The electrolysis of $H_2O$ is advantageously operated with electricity which has a neutral carbon footprint. A neutral carbon footprint is regarded in the context of the present disclosure as a generation of electricity, in the case of which the amount of total existing $CO_2$ is not increased by the generation of the electricity. Consequently, electricity obtained by solar energy, wind, water and/or atomic power is regarded as electricity with a neutral carbon footprint.

In some embodiments of the glass, the glass ceramic or the glass which can be ceramized to form glass ceramic, the glass comprises a refining agent $X_nO_m$, wherein the refining agent has an $O_2$ release of at most 30%, at most 20%, or at most 10%, from the refining agent in a melt of the glass in the case of temperature T2 and an oxygen partial pressure $p(O_2)$ of 1 bar. The selection rules defined above for refining agents and indications of particular refining agents correspondingly apply to the embodiments of the glass, the glass ceramic and the glass which can be ceramized to form glass ceramic.

Compositions of the Glass, the Glass Ceramic and the Glass which can be Ceramized to Form Glass Ceramic If a "glass composition" is mentioned in this description, this should be understood as an oxide composition of the glass, the glass ceramic or the glass which can be ceramized to form glass ceramic after melting and/or refining. In the event that chlorides and fluorides are used as additional refining agents, the "glass composition" relates to the oxide composition of the glass, the glass ceramic or the glass which can be ceramized to form glass ceramic including the metal chlorides and metal fluorides which are still present after melting and/or refining.

In other words, the "glass composition" is the combination of the oxides, chlorides and fluorides which is obtained after melting and/or refining.

The glass compositions provided according to the invention can contain high contents of $SiO_2$ and $B_2O_3$. As a result, glasses or glass ceramics of high quality can be obtained.

The glass compositions can be borosilicate, aluminosilicate or boro-aluminosilicate glasses or lithium-aluminium-silicate glass ceramics.

The glass compositions can comprise alkali metal oxides, such as e.g. $Li_2O$, $Na_2O$, and $K_2O$, in quantities of less than 20 wt.-%, less than 15 wt.-%, less than 12 wt.-%, less than 10 wt.-%, or less than 5 wt.-%. The glass compositions are optionally free from alkali metal oxides. In some embodiments, the quantity of alkali metal oxides in the glass composition is at least 1 wt.-%. A small quantity of alkali metal oxides advantageously leads to low $CO_2$ solubility in the melt.

The glass compositions can comprise alkaline earth metal oxides, such as e.g. MgO, CaO, SrO, BaO, in quantities of less than 20 wt.-%, less than 15 wt.-%, less than 12 wt.-%, less than 10 wt.-%, or less than 5 wt.-%. The glass compositions are optionally free from alkaline earth metal oxides. In some embodiments, the quantity of alkaline earth metal oxides in the glass composition is at least 1 wt.-%.

The glass compositions can contain iron, calculated on a $Fe_2O_3$ basis, in quantities of less than 0.05 wt.-%, less than 0.01 wt.-%, or less than 0.005 wt.-%. In some embodiments, the glass composition can contain $Fe_2O_3$ in a quantity of at least 0.0005 wt.-%, at least 0.001 wt.-%, or at least 0.002 wt.-%. In some embodiments, the glass composition can contain $Fe_2O_3$ in a quantity of 0.0005 to 0.05 wt.-%, 0.001 to 0.01 wt.-%, or 0.002 to 0.005 wt.-%.

The quantity of $Fe_2O_3$ relates to the total weight of the total iron in the glass composition, as if it were present in the form of $Fe_2O_3$. This does not mean, however, that any iron is present in this form. For example, any iron in the form FeO is included.

In some embodiments, the glass composition can contain $Fe_2O_3$ in a quantity of less than 1000 ppm, less than 500 ppm, or less than 200 ppm, relative to the total mass of the glass composition. The glass composition can optionally contain $Fe_2O_3$ in a quantity of at least 1 ppm, at least 10 ppm, or at least 50 ppm, relative to the total mass of the glass composition. In some embodiments, the glass composition can contain $Fe_2O_3$ in a quantity of 1 to 1000 ppm, in a quantity of 10 to 500 ppm, or in a quantity of 50 to 200 ppm, relative to the total mass of the glass composition.

The glass composition can contain $SiO_2$ in a quantity of at least 48 wt.-%, at least 55 wt.-%, at least 65 wt.-%, at least 70 wt.-%, or at least 75 wt.-%. The quantity of $SiO_2$ can optionally be up to 90 wt.-%, up to 87.5 wt.-%, up to 85 wt.-%, up to 82.5 wt.-%, or up to 80 wt.-%.

The glass composition can be a glass ceramic. In the case of a glass ceramic, the glass composition can contain nucleating agents, such as e.g. $TiO_2$ and/or $ZrO_2$. The total quantity of $TiO_2$ and/or $ZrO_2$ can optionally be at least 2.0 wt.-%, or at least 2.5 wt.-%. The total quantity of $TiO_2$ and/or $ZrO_2$ can optionally be less than 7.0 wt.-%, or less than 5.0 wt.-%. The glass composition can be e.g. a lithium-aluminium-silicate glass composition which contains at least 2.0 wt.-% $Li_2O$.

The glass composition can optionally contain $Al_2O_3$ in a quantity of at least 1.5 wt.-%, at least 5.0 wt.-%, or at least 10.0 wt.-%. The quantity of $Al_2O_3$ can be up to 25.0 wt.-%, up to 23.0 wt.-%, up to 20.0 wt.-%, or up to 18.0 wt.-%. In some embodiments, the quantity of $Al_2O_3$ can be from 1.5 to 23.0 wt.-%, from 5.0 to 20.0 wt.-%, or from 10.0 to 18.0 wt.-%.

Additionally or alternatively, the glass composition can contain $B_2O_3$ in a quantity of at least 0.5 wt.-%, at least 8.0 wt.-%, or at least 10.0 wt.-%. The quantity of $B_2O_3$ can be up to 25.0 wt.-%, up to 23.0 wt.-%, up to 20.0 wt.-%, up to 18.0 wt.-%, up to 16.0 wt.-%, or up to 14.0 wt.-%. In some embodiments, the quantity of $B_2O_3$ can be from 0.5 to 20.0 wt.-%, from 8.0 to 16.0 wt.-%, or from 10.0 to 14.0 wt.-%.

Many highly viscous glass compositions contain significant quantities of $SiO_2$, $Al_2O_3$ and $B_2O_3$. Optionally, the glass composition can contain a total content of $SiO_2$, $Al_2O_3$ and $B_2O_3$ of at least 75.0 wt.-%, at least 78.0 wt.-%, at least 80.0 wt.-%, at least 82.0 wt.-%, or at least 85.0 wt.-%. The total content of $SiO_2$, $Al_2O_3$ and $B_2O_3$ can be less than 97.0 wt.-%, less than 93.5 wt.-%, or less than 90.0 wt.-%. The quantity of $SiO_2$, $Al_2O_3$ and $B_2O_3$ can optionally be from 75.0 to 95.0 wt.-%, from 78.0 to 92.5 wt.-%, or from 85.0 to 90.0 wt.-%.

In some embodiments, the glass composition can be a lithium-aluminium-silicate glass which contains 3.0 to 4.2 wt.-% $Li_2O$, 19 to 23 wt.-% $Al_2O_3$, 60 to 69 wt.-% $SiO_2$, and optionally $TiO_2$ and/or $ZrO_2$, optionally 2.0 to 4.0 wt.-% $TiO_2$ and/or $ZrO_2$.

In some embodiments, the glass composition can—alternatively or additionally to the compositions described above—be described by the following composition ranges.

In some embodiments, the glass composition can be a borosilicate glass which contains the following components in wt.-%:

| | |
|---|---|
| $SiO_2$ | 70.0 to 87.0 |
| $B_2O_3$ | 7.0 to 25.0 |

-continued

| | |
|---|---|
| $Na_2O + K_2O$ | 0.5 to 9.0 |
| $Al_2O_3$ | 0.0 to 7.0 |
| CaO | 0.0 to 3.0 |

In some embodiments, the glass composition can be a borosilicate glass which contains the following components in wt.-%:

| | |
|---|---|
| $SiO_2$ | 70.0 to 86.0 |
| $Al_2O_3$ | 0.0 to 8.0, or 0.0 to 5.0 |
| $B_2O_3$ | 9.0 to 25.0 |
| $Na_2O$ | 0.5 to 8.0, or 0.5 to 5.0 |
| $K_2O$ | 0.0 to 1.0 |
| $Li_2O$ | 0.0 to 2.0, or 0.0 to 1.0 |

In some embodiments, the glass composition can be a borosilicate glass which contains the following components in wt.-%:

| | |
|---|---|
| $SiO_2$ | 70.0 to 80.0, or 71.0 to 77.0 |
| $Al_2O_3$ | 3.0 to 8.0, or 3.5 to 8.0 |
| $B_2O_3$ | 9.0 to 15.0, or 9.0 to 12.0 |
| $Na_2O$ | 5.5 to 8.0 |
| $K_2O$ | 0.0 to 1.0, or 0.1 to 0.5 |
| $Li_2O$ | 0.0 to 0.5, or 0.0 to 0.3 |
| CaO | 0.0 to 3.0, or 0.0 to 1.5 |
| BaO | 0.0 to 1.5 |
| $F^-$ | 0.0 to 0.3 |
| $Cl^-$ | 0.0 to 0.3 |
| MgO + CaO + BaO + SrO | 0.0 to 2.0 |

In some embodiments, the glass composition can be an alkali borosilicate glass which contains the following components in wt.-%:

| | |
|---|---|
| $SiO_2$ | 78.3 to 81.0 |
| $Al_2O_3$ | 3.5 to 5.3 |
| $B_2O_3$ | 9.0 to 13.0 |
| $Na_2O$ | 3.5 to 6.5 |
| $K_2O$ | 0.3 to 2.0 |
| CaO | 0.0 to 2.0 |

In some embodiments, the glass composition can be an alkali borosilicate glass which contains the following components in wt.-%:

| | |
|---|---|
| $SiO_2$ | 55.0 to 85.0 |
| $Al_2O_3$ | 0.0 to 15.0 |
| $B_2O_3$ | 3.0 to 20.0 |
| $Na_2O$ | 3.0 to 15.0 |
| $K_2O$ | 3.0 to 15.0 |
| ZnO | 0.0 to 12.0 |
| $TiO_2$ | 0.5 to 10.0 |
| CaO | 0.0 to 0.1 |

In some embodiments, the glass composition can contain the following components in wt.-%:

| | |
|---|---|
| $SiO_2$ | 58.0 to 75.0 |
| $Al_2O_3$ | 18.0 to 25.0 |
| $Li_2O$ | 3.0 to 6.0 |
| $Na_2O + K_2O$ | 0.1 to 2.0 |

-continued

| | |
|---|---|
| MgO + CaO + BaO + ZnO | 1.5 to 6.0 |
| $TiO_2 + ZrO_2$ | 2.0 to 6.0 | and optionally one or more of the oxides from Co, Ni, Fe, Nd, Mo, and optionally one or more refining agents selected from the group of $SnO_2$, chlorides, $As_2O_5$, $Sb_2O_5$, optionally 0.1 to 1.5 wt.-% $SnO_2$, or optionally 0.1 to 1.5 wt.-% $As_2O_5$, or optionally 0.1 to 1.5 wt.-% $Sb_2O_5$.

In some embodiments, the glass composition can contain the following components in wt.-%:

| | |
|---|---|
| $SiO_2$ | 58.0 to 65.0 |
| $Al_2O_3$ | 14.0 to 25.0 |
| $B_2O_3$ | 6.0 to 10.5 |
| MgO | 0.0 to 3.0 |
| CaO | 0.0 to 9.0 |
| BaO | 3.0 to 8.0 |
| ZnO | 0.0 to 2.0 | wherein the sum of MgO, CaO and BaO is from 8.0 to 18.0 wt.-%.

In some embodiments, the glass composition can contain the following components in wt.-%:

| | |
|---|---|
| $SiO_2$ | 50.0 to 68.0, or 55.0 to 68.0 |
| $Al_2O_3$ | 15.0 to 20.0 |
| $B_2O_3$ | 0.0 to 6.0 |
| $Li_2O$ | 0.0 to 6.0 |
| $Na_2O$ | 1.5 to 16.0, or 8.0 to 16.0 |
| $K_2O$ | 0.0 to 5.0 |
| MgO | 0.0 to 5.0 |
| CaO | 0.0 to 7.0, or 0.0 to 1.0 |
| ZnO | 0.0 to 4.0, or 0.0 to 1.0 |
| $ZrO_2$ | 0.0 to 4.0 |
| $TiO_2$ | 0.0 to 1.0, or substantially free from $TiO_2$ |

Referring now to the drawings, FIG. 1 shows the oxygen release of the refining agents $Sb_2O_3$, $As_2O_3$ and $SnO_2$ in a glass which can be ceramized to form a glass ceramic as a function of the temperature.

FIG. 2 shows the profile of the oxygen partial pressure $p(O_2)$ of a glass ceramic refined with $SnO_2$. If the refining temperature of a glass is reached with oxidic refining agents, the $p(O_2)$ of the melt is usually approx. 1 bar. Some of the oxidic refining agent is transformed in this case from the oxidized state into the reduced state. The $p(O_2)$ profile flattens off from 1600° C. and from 1650° C. the $p(O_2)$ curve runs approximately constantly in the case of approximately 1 bar. From a temperature of 1700° C., the $p(O_2)$ falls significantly as a result of the exchange with the atmosphere and drops to approximately 0.2 bar. As a result of this reduction in the $p(O_2)$, the conversion rate of the refining agent is further increased to the benefit of $Sn^{2+}$ or SnO.

Figure 3:
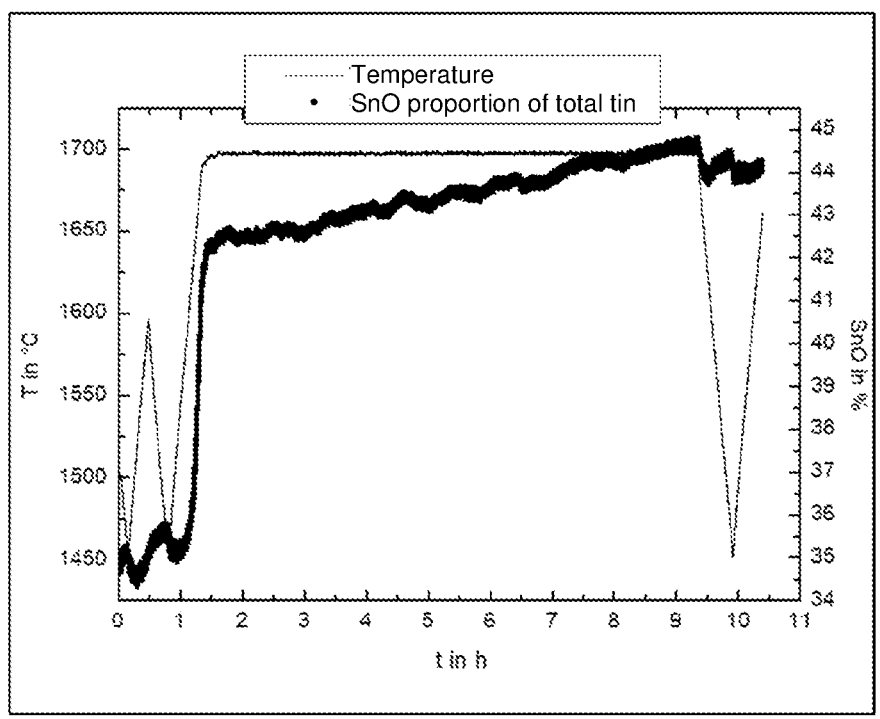
FIG. 3 illustrates the SnO proportion in mol % relative to the total quantity of tin, i.e. SnO and $SnO_2$, in a $SnO_2$-refined glass ceramic as a function of the temperature and the time of the melting and refining method.

FIG. 3 shows the SnO proportion relative to the total quantity of tin, i.e. SnO and $SnO_2$, in a $SnO_2$-refined glass ceramic as a function of the temperature and time of the melting and refining process. Prior to the refining step, the SnO proportion in the total quantity to tin is approx. 35% (molar ratio of SnO to SnO and $SnO_2$). As a result of the increase to a refining temperature of 1700° C., the SnO proportion increases to approx. 42.5%. As a result of holding the method at this refining temperature and the falling $p(O_2)$ value (cf. FIG. 2), the SnO proportion increases to 44.5%.

The tin conversion during the refining step is of importance here for the success of the refining, i.e. in relation to reduced bubbles in the refined glass ceramic. The additional tin conversion is, as a result of the increase to 1700° C. (at t=1.5 h), approx. 7.5% SnO. As a result of the holding at 1700° C. for approximately 8 hours and the exchange of the melt with the gas atmosphere, the reduction in $p(O_2)$ in the melt arises, and a further 2% of the existing tin is converted to SnO. At 1700° C., the viscosity of the glass ceramic is lower by a factor of 2 than at 1600° C. As a result of this, the remaining bubbles in the case of 1700° C. rise by a factor of 2 faster than in the case of 1600° C. The bubble removal in the case of 1700° C., which temperature is maintained during refining, is largely determined by the ongoing SnO conversion.

Examples

Glass Production

The described glasses were represented as follows: A batch of glass raw materials was mixed and heated in a continuously operating, dual-housing crucible which is composed of a melting part and a refining part. Each part has a volume of approximately 40 litres. Three different glass compositions were produced: A) a glass ceramic, B) a pharmaceutical glass, and C) an optical glass.

| Oxide | A [wt.-%] | B [wt.-%] | C [wt.-%] |
|---|---|---|---|
| $Al_2O_3$ | 20.88 | 5.35 | |
| $As_2O_3$ | | 0.04 | |
| $B_2O_3$ | | 10.5 | 11.3 |
| BaO | 2.29 | | 1.4 |
| CaO | 0.42 | 1.4 | 0.2 |
| Cl | | | 0.3 |
| F | | 0.18 | |
| $Fe_2O_3$ | 0.08 | 0.02 | 0.01 |
| $K_2O$ | 0.22 | | 6.8 |
| $Li_2O$ | 3.71 | | |
| MgO | 0.37 | | |
| $Na_2O$ | 0.59 | 7.11 | 10.0 |
| $Sb_2O_3$ | | | 0.3 |
| $SiO_2$ | 65.14 | 75.3 | 69.5 |
| $SnO_2$ | 0.24 | | |
| $TiO_2$ | 3.1 | 0.02 | 0.05 |
| $V_2O_5$ | 0.03 | | |
| ZnO | 1.5 | | |
| $ZrO_2$ | 1.34 | 0.03 | |
| Total | 99.91 | 99.95 | 99.86 |

The melting and refining temperatures or corresponding ranges were adapted specifically to the respective glass product.

| | Melting part | | Refining part | |
|---|---|---|---|---|
| Glass | Melt | Crown | Melt | Crown |
| A | 1510° C. | 1630° C. | 1620° C. | 1635° C. |
| B | 1475° C. | 1570° C. | 1540° C. | 1630° C. |
| C | 1300° C. | 1305° C. | 1400° C. | 1477° C. |

The firing of the glass raw materials and the glass melt was realized via a separate fuel burner for each part, i.e. two separate burners for the melting part and the refining part, as well as by additional electric heating. The two fuel burners can be operated independently with natural gas, hydrogen or a specific mixture of both. Pt20Rh plate electrodes are used for the electric heating.

Two electrodes of a size of 225×225×3 mm and a heater circuit were used in the melting part. Four electrodes of a size of 125×125×3 mm and a heater circuit were used in the refining part. The glass melt was removed from the refining part by a Pt10/Rh channel after an average dwell time in both the melting part and the refining part of 18.3 h (A), 16.5 h (B) or 18.6 h (C).

The three different glass compositions contain an initial quantity of $Fe_2O_3$ (indicated in mol % and in ppm, relative to the batch of glass raw materials). After melting and refining, the glass product obtained had both $Fe^{2+}$ and also $Fe^{3+}$ species, the quantity of which was determined quantitatively by UV-VIS spectroscopy which was indicated in mol % and as ratio $X_{red}$ ($Fe^{2+}/Fe^{3+}$) of the two species.

A:

| Species | mol % | ppm | |
|---|---|---|---|
| $Fe_2O_3$ | 0.0372 | 930 | $X_{red}$ |
| $Fe^{2+}$ | 0.00967 | | 0.13 |
| $Fe^{3+}$ | 0.06473 | | |

B:

| Species | mol % | ppm | |
|---|---|---|---|
| $Fe_2O_3$ | 0.0068 | 170 | $X_{red}$ |
| $Fe^{2+}$ | 0.00030 | | 0.022 |
| $Fe^{3+}$ | 0.01330 | | |

C:

| Species | mol % | ppm | |
|---|---|---|---|
| $Fe_2O_3$ | 0.0048 | 120 | $X_{red}$ |
| $Fe^{2+}$ | 0.00096 | | 0.10 |
| $Fe^{3+}$ | 0.00864 | | |

Adjusting the Refining Temperature

The required refining temperature can be identified for a given refining agent e.g. from the viscosity of the respective glass melt. This is due to the circumstances that the bubbles in the melt can only leave it in the case of a sufficiently low viscosity in a relevant time in terms of technical production. Refining temperatures (T2) are generally adjusted for glasses with an $SiO_2$ basis such that the viscosity of the glass melt during refining lies at $10^2$ dPa*s. An appropriate refining agent is then selected as a function of refining temperature T2. FIG. 1 shows the $O_2$ release curves in a melt for refining agents $Sb_2O_3$, $As_2O_3$ and $SnO_2$. It is apparent from this that there is a clear gradation in the $O_2$ release as a function of the temperature. For example, $Sb_2O_3$ releases the oxygen at comparatively low temperatures and $SnO_2$ releases it at higher temperatures, whereas $As_2O_3$ lies therebetween.

Viscosity

The viscosity can be determined e.g. by rotational viscometry, e.g. via DIN ISO 7884-2:1998-2. The relationship between viscosity and temperature is described by the VFT equation (Vogel-Fulcher-Tammann).

Iron Content

The iron content is determined by spectral analysis in the obtained glass product, in accordance with DIN 51001:2003-08. In particular, the ratio between $Fe^{2+}$ and $Fe^{3+}$ in the obtained glass product was determined quantitatively by deconvolution of the UV/vis transmission spectra.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for melting and/or refining glass, glass ceramic or glass which can be ceramized to form glass ceramic, the method comprising:
   providing a batch of raw materials;
   heating the batch until a melt of molten glass is obtained, wherein the batch is heated at least in sections to a temperature above T3 which corresponds to a viscosity of the molten glass of $10^3$ dPa*s;
   refining the melt, wherein the melt is heated at least in sections to a temperature above T2.5 which corresponds to a viscosity of the molten glass of $10^{2.5}$ dPa*s, wherein refining of the melt comprises adjusting an oxygen partial pressure $p(O_2)$ which is reduced by at least 60% relative to an $O_2$ saturation in the melt at temperature T3; and
   obtaining a refined glass, a refined glass ceramic or a refined glass which can be ceramized to form glass ceramic;
   wherein at least one refining agent of the formula $X_nO_m$, wherein n=1 or 2, m=2 or 5, and X=As, Sb, Sn, or Ce, and/or of the formula $M_nSO_4$, wherein n=1 or 2, and M=Na, K, Li, Mg, Ca, Sr, Ba and/or Zn is used with a concentration of 2 wt.-% or less relating to a sum of all oxidized and reduced species of the respective refining agent, relative to a total mass of the batch of raw materials, and
   wherein the at least one refining agent of the formula $X_nO_m$ and/or of the formula $M_nSO_4$ has the thermodynamic property that it has an at least 30% conversion from a higher into a lower oxidation state in a melt of the same composition as the melt in the refining step in the case of an oxygen partial pressure $p(O_2)$ of 1 bar and a temperature T2, according to the reaction of $X_nO_m \rightarrow X_nO_{m-1} + \frac{1}{2}O_2$ and/or $X_nO_m \rightarrow X_nO_{m-2} + O_2$, and/or according to the reaction of $M_nSO_4 \rightarrow MnO + SO_2 + \frac{1}{2}O_2$, wherein temperature T2 corresponds to a viscosity of the molten glass of $10^2$ dPa*s.

2. The method of claim 1, wherein an $Fe^{2+}$ to $Fe^{3+}$ ratio in the refined glass, the refined glass ceramic or the refined glass which can be ceramized to form glass ceramic is at least 0.02.

3. The method of claim 1, wherein an $X_nO_{m-1}$ to $X_nO_m$ ratio or an $X_nO_{m-2}$ to $X_nO_m$ ratio in the refined glass, the refined glass ceramic or the refined glass which can be ceramized to form glass ceramic is at least 0.6.

4. The method of claim 1, wherein the refining agent is selected from the group consisting of $Na_2SO_4$, $K_2SO_4$, $Li_2SO_4$, $MgSO_4$, $CaSO_4$, $SrSO_4$, $ZnSO_4$, $Sb_2O_5$, $As_2O_5$, $CeO_2$ and $SnO_2$.

5. The method of claim 1, wherein the refined glass or the refined glass ceramic has fewer than 80 bubbles of a size of 0.1 mm to 0.2 mm per 10 kg glass and/or fewer than 2 bubbles of a size of more than 0.2 mm per 10 kg glass.

6. The method of claim 1, wherein a refining period in a discontinuous process is at least 2 hours and at most 96 hours, or wherein an average dwell time of the melt during refining in a continuous process is at least 2 hours and at most 18 hours.

7. The method of claim 1, wherein the glass, glass ceramic or glass which can be ceramized to form glass ceramic has a borosilicate, an aluminosilicate, a boro-aluminosilicate, or a lithium-aluminium-silicate composition.

8. The method of claim 1, wherein the method comprises heating by $H_2$ and $O_2$ combustion.

9. The method of claim 1, wherein melting is performed using an oxygen to fuel equivalence ratio $\lambda > 1.00$ and/or refining is performed using an oxygen to fuel equivalence ratio $\lambda < 1.05$.

10. The method of claim 1, wherein the refined glass, the refined glass ceramic or the refined glass which can be ceramized to form glass ceramic has a neutral carbon footprint.

11. The method of claim 1, wherein a ratio of a reduced form of the refining agent to an oxidized form of the refining agent in the refined glass, the refined glass ceramic or the refined glass which can be ceramized to form glass ceramic is at least 0.6.

12. A method for melting and/or refining glass, glass ceramic or glass which can be ceramized to form glass ceramic, the method comprising:
providing a batch of raw materials;
heating the batch until a melt is obtained;
refining the melt; and
obtaining a refined glass, a refined glass ceramic or a refined glass which can be ceramized to form glass ceramic;
wherein melting and/or refining is performed with heating by $H_2$ and $O_2$ combustion, and
wherein melting is performed using an oxygen to fuel equivalence ratio $\lambda > 1.00$ and refining is performed using an oxygen to fuel equivalence ratio $\lambda < 1.05$.

13. The method of claim 12, wherein the batch is heated at least in sections to a temperature above T3 which corresponds to a viscosity of the molten glass of $10^3$ dPa*s and the melt is heated at least in sections to a temperature above T2.5 which corresponds to a viscosity of the molten glass of $10^{2.5}$ dPa*s.

14. The method of claim 12, further comprising adjusting an oxygen partial pressure $p(O_2)$ during refining of the melt to a value which is reduced by at least 60% relative to the $O_2$ saturation in the melt at temperature T3.

15. The method of claim 12, wherein the glass, glass ceramic or glass which can be ceramized to form glass ceramic has a borosilicate, an aluminosilicate, a boro-aluminosilicate, or a lithium-aluminium-silicate composition.

16. The method of claim 12, wherein the $Fe^{2+}$ to $Fe^{3+}$ ratio in the refined glass, the refined glass ceramic or the refined glass which can be ceramized to form glass ceramic is at least 0.02.

17. The method of claim 12, wherein the refined glass, the refined glass ceramic or the refined glass which can be ceramized to form glass ceramic has fewer than 80 bubbles of a size of 0.1 mm to 0.2 mm per 10 kg glass and/or fewer than 2 bubbles of a size of more than 0.2 mm per 10 kg glass.

18. The method of claim 12, wherein the refined glass, the refined glass ceramic or the refined glass which can be ceramized to form glass ceramic has a neutral carbon footprint.

19. The method of claim 12, wherein a ratio of a reduced form of a refining agent to an oxidized form of the refining agent in the refined glass, the refined glass ceramic or the refined glass which can be ceramized to form glass ceramic is at least 0.6.

20. A method for melting and/or refining glass, glass ceramic or glass which can be ceramized to form glass ceramic, the method comprising:
providing a batch of raw materials;
heating the batch until a melt of molten glass is obtained, wherein the batch is heated at least in sections to a temperature above T3 which corresponds to a viscosity of the molten glass of $10^3$ dPa*s;
refining the melt, wherein the melt is heated at least in sections to a temperature above T2.5 which corresponds to a viscosity of the molten glass of $10^{2.5}$ dPa*s, wherein the heating is performed using an oxygen to fuel equivalence ratio $\lambda > 1.00$ and/or the refining is performed using an oxygen to fuel equivalence ratio $\lambda < 1.05$;
obtaining a refined glass, a refined glass ceramic or a refined glass which can be ceramized to form glass ceramic, wherein at least one refining agent of the formula $X_nO_m$, wherein n=1 or 2, wherein m=2 or 5, wherein and X=As, Sb, Sn, or Ce, and/or of the formula $M_nSO_4$, wherein n=1 or 2, and M=Na, K, Li, Mg, Ca, Sr, Ba and/or Zn is used with a concentration of from 0.1 to 1 wt.-% relating to a sum of all oxidized and reduced species of the respective refining agent, relative to a total mass of the batch of raw materials, wherein the at least one refining agent has the thermodynamic property that it has an at least 30% conversion from a higher oxidation state into a lower oxidation state in a melt of the same composition as the melt in the refining step in the case of an oxygen partial pressure $p(O_2)$ of 1 bar and a temperature T2, according to the reaction of $X_nO_m \rightarrow X_nO_{m-1} + \frac{1}{2}O_2$ and/or $X_nO_m \rightarrow X_nO_{m-2} + O_2$, and/or according to the reaction of $M_nSO_4 \rightarrow MnO + SO_2 + \frac{1}{2}O_2$, wherein temperature T2 corresponds to a viscosity of the molten glass of $10^2$ dPa*s; and
adjusting an oxygen partial pressure $p(O_2)$ during refining of the melt which is reduced by at least 60% relative to an $O_2$ saturation in the melt at temperature T3.

* * * * *